United States Patent Office 3,703,411

Patented Nov. 21, 1972

3,703,411

METHOD OF MAKING A MAGNETIC RECORDING MEDIUM

Cevdet Melezoglu, Corning, N.Y., assignor to Corning Glass Works, Corning, N.Y.

No Drawing. Filed Apr. 22, 1968, Ser. No. 723,319
Int. Cl. H01f 10/02, 10/04
U.S. Cl. 117—237 2 Claims

ABSTRACT OF THE DISCLOSURE

A method of making a magnetic recording medium or media comprising the steps of providing a substrate or support member of a vitreous material such as a glass or glass-ceramic in the form of a tape, disk or cylinder, heating such support member, spraying a surface of the heated member with a solution of ferric chloride to form thereon a coating or film of ferric oxide having magnetic properties. If only alpha ferric oxide is formed on said surface the support member may be subjected to a reducing atmosphere at elevated temperatures to change the coating to magnetite. It is preferable to thereafter subject said support member to an oxidizing atmosphere at elevated temperatures to change said coating to gamma ferric oxide.

BACKGROUND OF THE INVENTION

Heretofore, binders such as cellulose acetate have been employed for binding particles of a magnetic material to each other and to carriers or support members of a non-magnetic material for the purpose of making or manufacturing magnetic recording media. The use of binders as heretofore required adds to the cost of recording media, and, therefore, the present invention was developed to provide a method of making or manufacturing recording media without the use of binders.

BRIEF SUMMARY OF THE INVENTION

In practicing one embodiment of the invention disclosed a support member of a vitreous material is provided, is heated to a temperature within a prescribed temperature range and a surface of said support member is then sprayed with an aqueous solution of ferric chloride, $FeCl_3$, and hydrochloric acid, HCl, to form on said heated surface an adherent coating or film comprising a mixture of alpha (non-magnetic) ferric oxide, $Fe_2O_3$, and (magnetic) gamma ferric oxide, $Fe_2O_3$. The heated support member is then permitted to cool to room temperature.

In practicing a preferred embodiment of the invention disclosed, a support member of a vitreous material is heated to a temperature within a first prescribed temperature range, a surface of the heated support member is then sprayed with an aqueous solution of ferric chloride, $FeCl_3$, and hydrochloric acid, HCl, to form on said heated surface an adherent coating or film of (non-magnetic) alpha ferric oxide, $Fe_2O_3$, and said support member is then heated in a reducing $H_2$ atmosphere to a temperature within a second temperature range and is held within such temperature range for a prescribed period of time to change said film or coating of alpha ferric oxide, $Fe_2O_3$, to a film or coating of magnetite, $Fe_3O_4$. The support member may then be permitted to cool to room temperature to provide a magnetic recording medium. It is, however, preferred to further process the magnetite, $Fe_3O_4$, film or coating on said support member and this is performed by heating such member to a temperature within a third prescribed temperature range in an oxidizing, $O_2$, atmosphere and maintaining the support member within such temperature range for a prescribed period of time to change said film or coating of magnetite, $Fe_3O_4$, to a film or coating of (magnetic) gamma ferric oxide, $Fe_2O_3$. The support member is thereafter permitted to cool to room temperature to provide said recording medium.

PREFERRED EMBODIMENTS OF THE INVENTION

In practicing the invention disclosed, in accordance with one embodiment of the invention, 50 grams of ferric chloride, $FeCl_3 \cdot 6H_2O$, were thoroughly mixed with 50 cubic centimeters of a mixture of water, $H_2O$, and dilute hydrochloric acid, HCl, the latter mixture having about 5 to 1 ratio by volume of water to hydrochloric acid although such ratio is not critical to the invention and may vary 50% in either direction.

A substrate or support member of a vitreous material is heated to a temperature between about 100 and 350 degrees centigrade and a surface of such heated member is then uniformly sprayed, as by a suitable spray gun, with said aqueous solution of ferric chloride. The heat of the heated support member drives off the water from said solution and leaves on said surface a thin adherent film or coating of a mixture of (non-magnetic) alpha ferric oxide, $Fe_2O_3$, and (magnetic) gamma ferric oxide, $Fe_2O_3$. The support member is then permitted to cool to room temperature.

The coating or film provided on said support member as described above has some magnetism and the coated support member may be employed as a recording medium for limited purposes only. Therefore, the method set forth below is the preferred embodiment of the invention.

A substrate or support member as set forth above is heated to a temperature between about 350 and 700 degrees centigrade and a surface of the heated substrate or support member is sprayed as above with said aqueous solution of ferric chloride. The heat of the heated support member drives off the water from said solution and leaves a thin adherent film or coating of alpha ferric oxide, $Fe_2O_3$, on said surface of the support member. The support member is then heated in a reducing hydrogen, $H_2$, atmosphere to a temperature between about 380 and 420 degrees centigrade for a period of about 10 to 40 minutes to change said coating or film or alpha ferric oxide, $Fe_2O_3$, to a coating or film of magnetite, $Fe_3O_4$. Such film or coating also has some magnetism and the support member with such film or coating may also be employed as a magnetic recorded medium for some purposes. However, it is preferred to further process the film or coating of the support member as set forth below.

Following the step of reducing the coating or film of alpha ferric oxide, $Fe_2O_3$, to a coating or film of magnetite, $Fe_3O_4$, as discussed above, the support member provided with such film or coating is heated to a temperature between about 200 to 350 degrees centigrade in an oxidizing, $O_2$, atmosphere for a period of about 1 to 10 hours to change said film or coating of magnetite, $Fe_3O_4$, to a coating or film of gamma ferric oxide, $Fe_2O_3$. The support member is thereafter permitted to cool to room temperature. The film or coating of gamma ferric oxide, $Fe_2O_3$, so provided on said support member shows superior magnetism and such support member has, therefore, superior qualities as a magnetic recording medium.

It is pointed out that magnetic recording media made or manufactured as set forth do not, as previously mentioned, require the use of binders in the solutions used for providing the magnetic recording films or coatings on the recording media and that such films or coatings have excellent adherence, substantially uniform thickness and high magnetic flux densities. Furthermore, the vitreous substrates or support members can be formed with, or readily ground and polished to be provided with extremely smooth surfaces for deposition thereon of said magnetic recording films or coatings which also have optimum smoothness. Said vitreous substrates or support members may be glass or glass-ceramic disks, cylinders or tapes and are preferably chemically strengthened by one of the ion exchange processes now well known in the art. Such vitreous substrates or support members have the distinct advantages of chemical inertness, durability, surface smoothness and economy and, when chemically strengthened as mentioned, substantial strength and flexibility.

Although there is herein described only several specific examples of the practice of the invention, it will be understood that the invention is not intended to be limited to the specific embodiments set forth but that the protection sough for the invention disclosed is intended to be limited only by the scope of the appended claims.

I claim:

1. The method of making a magnetic recording medium, such method consisting essentially of, (A) providing a support member of a vitreous material, (B) heating said member to a temperature between about 350 and 700 degrees centigrade;

(C) spraying a surface of the heated support member with an aqueous solution of ferric chloride ($FeCl_3$) and hydrochloric acid (HCl) to form on said surface a coating of alpha ferric oxide ($Fe_2O_3$); and (D) heating said support member to a temperature between about 380 and 420 degrees centigrade in a reducing hydrogen ($H_2$) atmosphere for a period of about 10 to 40 minutes to change said coating of alpha ferric oxide ($Fe_2O_3$) to a coating of magnetite ($Fe_3O_4$).

2. The method in accordance with claim 1 and including the further steps of heating said support member to a temperature between about 200 to 350 degrees centigrade in an oxidizing ($O_2$) atmosphere for a period of about 1 to 10 hours to change said coating of magnetite ($Fe_3O_4$) to a coating of gamma ferric oxide ($Fe_2O_3$) and thereafter permitting said support member to cool to room temperature.

References Cited

UNITED STATES PATENTS

| | | | |
|---|---|---|---|
| 2,915,730 | 12/1959 | Davis | 117—106 UX |
| 2,919,207 | 12/1959 | Schölzel | 117—235 X |
| 3,131,082 | 4/1964 | Gambino | 117—235 X |
| 3,330,693 | 7/1967 | Rumberger | 117—235 X |
| 3,046,158 | 7/1962 | Fukuda et al. | 117—237 X |

ALFRED L. LEAVITT, Primary Examiner

J. R. BATTEN, Jr., Assistant Examiner

U.S. Cl. X.R.

117—123 A, 124 A, 235